P. C. HEWITT.
FLYING MACHINE.
APPLICATION FILED JUNE 14, 1919.
1,378,112.
Patented May 17, 1921.
2 SHEETS—SHEET 2.
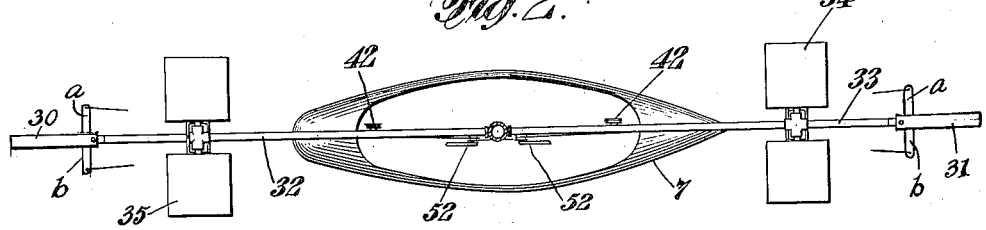
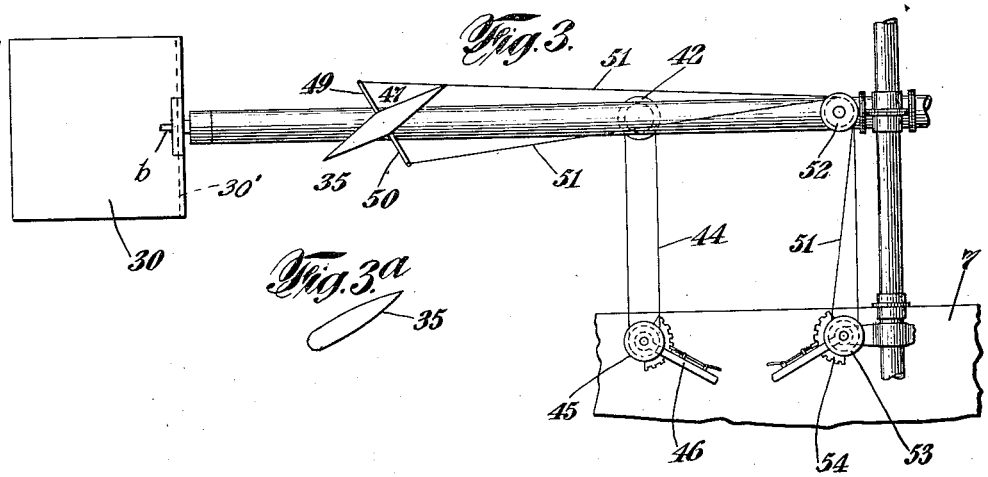
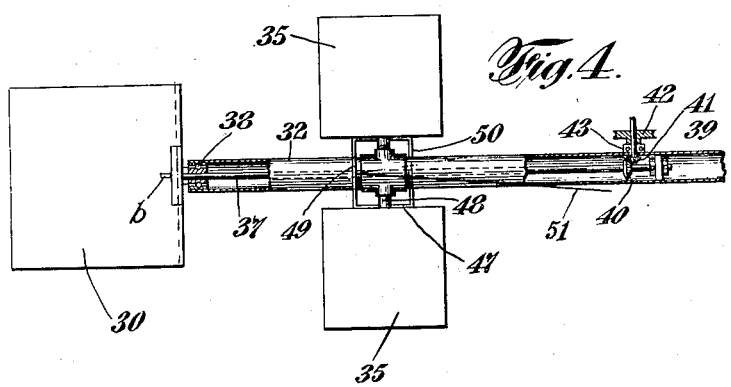
INVENTOR
Peter Cooper Hewitt,
BY
Kenyon & Kenyon
his ATTORNEYS

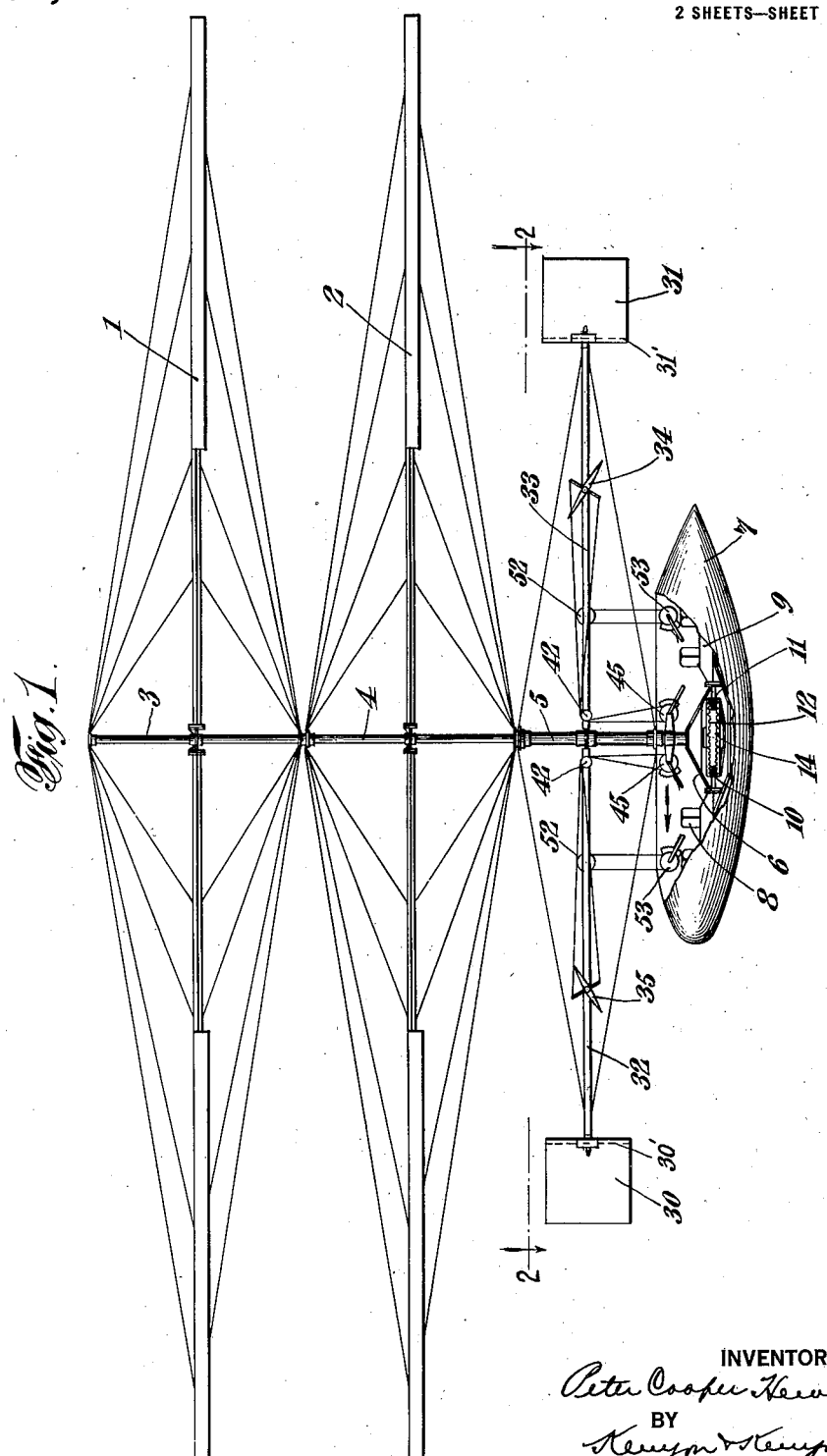

UNITED STATES PATENT OFFICE.

PETER COOPER HEWITT, OF RINGWOOD MANOR, NEW JERSEY.

FLYING-MACHINE.

1,378,112.   Specification of Letters Patent.   Patented May 17, 1921.

Application filed June 14, 1919. Serial No. 304,190.

*To all whom it may concern:*

Be it known that I, PETER COOPER HEWITT, a citizen of the United States, and a resident of Ringwood Manor, Passaic county, and State of New Jersey, have invented certain new and useful Improvements in Flying-Machines, of which the following is a specification.

My invention relates to flying machines and more particularly to flying machines of the helicopter type, in which the machine is lifted by action of propeller rotating about a vertical axis.

In other applications filed on even date herewith I have described and claimed certain broad and fundamental helicopter features invented by me and certain improvements made by me in the construction of helicopters. In this application I show and claim certain improvements relating to steering, guiding or controlling means adapted for such machines.

The accompanying drawings forming a part of this specification illustrate one embodiment of the invention applied to a helicopter.

In the drawings: Figure 1 is a side elevation of the said embodiment of the invention, part of the fuselage being broken away.

Fig. 2 is a plan view of the same below the line 2—2 of Fig. 1.

Fig. 3 is a fragmentary side elevation, showing on a larger scale a portion of the steering means and the operating devices therefor.

Fig. 3ª is a detail view showing a steering wing made of stream line form.

Fig. 4 is a plan view of a portion of the same with parts broken away, the outer plane or wing being turned 90 degrees from the position shown in Fig. 3.

The helicopter shown comprises an upper propeller 1 and a propeller 2 below the same, the propeller 1 being carried by a normally vertical shaft 3 which passes through the tubular shaft 4 of the propeller 2. The shaft 4 extends through a tubular bearing 5 forming part of the frame 6 of the machine and stationary with respect thereto. This frame carries a fuselage 7.

The shafts 3 and 4 and the propellers carried thereby are driven in opposite directions by motors or engines 8 and 9 of equal power arranged one to the front and the other to the rear of the shafts 3 and 4, and having their driving shafts arranged in axial alinement longitudinally of the fuselage 7, the axis of said driving shafts intersecting the axis of the shafts 3 and 4 at right angles. The shaft of the engine or motor 8 is provided with a beveled pinion 10, and the shaft of the motor 9 with the beveled pinion 11. Each of these pinions meshes with a beveled gear 12 secured to the shaft 4 above the pinion, and also with the beveled gear 14 secured to the shaft 3 below the pinion.

The arrangement shown is such that a balanced action is obtained in driving the shafts 3 and 4, and there is substantially no thrust on the various bearings inasmuch as each moving part of the mechanism is acted upon by equal forces acting in opposite directions. Each of the gears 12 and 14, for example, is acted upon on one side of its axis by the pinion 10, tending to drive the same in one direction, for example, forwardly, referring to Fig. 1, while on the other side of its axis it is acted upon by the pinion 11, tending to drive the same with equal force in the opposite direction, or rearwardly in the case assumed. In other words, a true dynamic couple is obtained, causing rotation with no thrust upon the bearings, with the motors exercising equal power. The driving means for the propellers are claimed in another application filed on even date herewith, and a further description thereof is thought to be unnecessary herein.

For turning the fuselage carrying frame 6 of the machine about the axis of the shafts 3 and 4 so as to enable it to face in different directions, or to balance any unequal rotary effort of the propellers, I provide, as shown in the drawings, planes or wings 30 and 31, of the same shape and equal areas located at the extremities of the arms 32 and 33, respectively, of the frame of the machine. These planes are capable of being tilted about a horizontal axis passing through their centers and are located below the propeller blades so as to receive the down draft therefrom when the propellers are rotated.

Each of the planes or wings 30 and 31 is secured, as shown, to a rod 37 (see Fig. 4), rotatably mounted in the corresponding arm 32 or 33, as by bearings 38 and 39 and has secured thereto a bevel gear 40 meshing with the bevel gear 41 secured to a pulley 42. The gear 41 and pulley 42 are desirably mounted in a bearing 43, secured to the corresponding arm 32 or 33. The pulley 42 may be rotated by a belt 44 passing over the same and over a second pulley 45 which has a pawl and ratchet 46 coöperating therewith to permit the same to be releasably held against rotation. By releasing the ratchet 46 the belt 44 may be moved to cause rotation of the plane or wing 30 or 31 about its axis to enable the plane to be positioned either in a vertical or inoperative position, or in a horizontal position, or in any desired intermediate position. As clearly shown in Fig. 1, the control or operating means of the plane or wing 30 is independent of, and of the same construction and arrangement as, the control or operating means of the plane or wing 31 so that these planes or wings may be moved or adjusted independently of each other and in the same manner.

When it is desired to exert a turning effort upon the fuselage of the machine about the axis of the shafts 3 and 4, the planes 30 and 31 are tilted in opposite directions away from their normally vertical positions by movement of the belt 44. The result of the adjustment is that the down draft from the propeller blades, with the propellers rotating, tends to cause the plane 30 to move laterally in one direction, and the plane 31 to move laterally in the opposite direction with an equal force, thereby producing a dynamic couple which tends to rotate the fuselage as desired, without unbalanced lateral thrust. As soon as the fuselage has been rotated to the desired position, the planes 30 and 31 are returned to normal vertical position. These planes may be moved laterally from vertical position to exert by their movement a rotary effort upon the machine when the latter is moving horizontally.

In the machine shown, the propellers rotating in opposite directions exert equal reactions in opposite directions upon the frame 6 of the machine so that they have no tendency to turn said frame about their axis. In case there should be an unequal reaction of the propellers upon said frame, these planes or wings 30 and 31 may be used to correct the resultant tendency of the frame to rotate about the axis of the propellers.

In case it is desired to tilt the machine so as to produce lateral motion thereof as understood in the art, one only of the planes or wings 30 and 31 is moved to horizontal position, the other remaining vertical, whereupon the down draft from the rotating propellers forces this plane or wing downwardly, without acting upon the other plane or wing, and tilts the machine.

Additional means are desirably provided for maintaining the machine tilted after it has begun its movement laterally. These means, as shown, comprise planes or wings 34 and 35, of the same shape and equal areas, carried by the arms 32 and 33, respectively, and rotatable about horizontal axes transverse to the arms 32 and 33. Each of the planes 34 and 35, as shown, comprises like sections mounted on both of the two sides of the machine. These planes are located inwardly of the inner edges of the propeller blades and do not receive any down draft therefrom.

To permit simultaneous operation of the two sections of each wing 34 or 35 these two sections are connected, as by loop 47 secured to the horizontal shaft 48 by means of which the sections of the wing are pivotedly mounted upon the arm 32 or 33. This loop is arranged at right angles to the corresponding wing and surrounds the corresponding arm 32 or 33. Each of the loops 47 is provided with a portion 49 which extends above the corresponding arm 32 or 33 and a portion 50 which extends below said arm. To the centers of the upper and lower portions 49 and 50 of the loop 47 are secured the ends of a wire 51 which extends over a guide pulley 52 rotatably mounted upon the side of the corresponding arm 32 or 33 and around a drum or pulley 53. The latter may be held in the desired adjustment about its axis, as by pawl and ratchet mechanism 54. Separate controlling and operating means of like construction and arrangement are provided for the wings or planes 34 and 35. By adjustment of the wires 51, the planes or wings 34 and 35 may be adjusted independently of each other to the desired inclination. By inclining them in opposite directions from the horizontal, as shown, the air will, if the machine moves forwardly in the direction of the arrow, press against the upper surface of the plane 35 and the lower surface of the plane 34 with equal force, thereby producing a dynamic couple tending to maintain the machine tilted against its tendency to right.

The wings 30 and 31 may also be arranged to be rotatable about vertical axes 30' and 31' so as to be capable of being used like rudders to balance unequal effort of the propellers tending to turn the machine when it is in horizontal movement or if being used to turn the machine when it is moving horizontally. These wings may be moved about said axes by wires connected to projections $a$, $b$ extending outwardly from opposite sides of the wings. The wires may be controlled by pawl and ratchet mechanism (not shown) like those already described. In operation the wings are turned in opposite directions about their vertical axes, so that the air acting thereon while the machine is in horizontal flight will produce on the wings a dynamic couple extending to turn the fuselage about a vertical axis.

Any of the steering wings may be made of approved stream line form to give minimum resistance. In Fig. 3ᵃ I have the wing 35 made of such form.

While I have shown one form of my invention, it is to be understood that I am not limited to this form and that many modifications may be made in the device disclosed without departing from the invention.

Having thus described my invention, what I claim as new and desire to secure by Letters Patent is:

1. A helicopter comprising a propeller, means supporting the propeller, means for driving the propeller about an upright axis, means arranged to be acted upon by the draft from the propeller for tilting said propeller supporting means to cause lateral movement of the helicopter, and means for maintaining said propeller supporting means tilted when the helicopter moves laterally.

2. A helicopter, comprising a propeller, means supporting the propeller, means for driving the propeller about an upright axis, means arranged to be acted upon by the draft from the propeller to tilt said propeller supporting means to cause lateral movement of the helicopter, and means for maintaining said propeller supporting means tilted independently of the draft from the propeller when the helicopter moves laterally.

3. A helicopter comprising a plurality of propellers, means supporting the propellers, means for driving the propellers in opposite directions about an upright axis, a tiltable wing arranged to be acted upon by the draft from the propellers to tilt said propeller supporting means to cause lateral movement of the helicopter, and wings tiltable in opposite directions for maintaining said propeller supporting means tilted independently of the draft from the propellers when the helicopter moves laterally.

4. A helicopter comprising a propeller, means supporting the propeller, means for driving the propeller about an upright axis, means arranged to be acted upon by the draft from the propeller to tilt said propeller supporting means to cause lateral movement of the helicopter, and wings tiltable in opposite directions for maintaining said propeller supporting means tilted independently of the draft of the propeller when the helicopter moves laterally.

5. In a helicopter, the combination of a propeller, a frame supporting the propeller, means for rotating the propeller about an upright axis, means arranged to be acted upon by the draft from the propeller to exert upon the frame a couple tending to turn the frame about said axis, and means for rendering said turning means operative or inoperative to so turn the frame and for rendering the same operative or inoperative to exert a lateral turning effort upon said frame when the machine moves laterally.

In testimony whereof, I have signed my name to this specification.

PETER COOPER HEWITT.